Dec. 5, 1939.   C. ACHEN   2,182,270
ATTACHMENT FOR CULTIVATORS
Filed Aug. 11, 1938   2 Sheets-Sheet 1
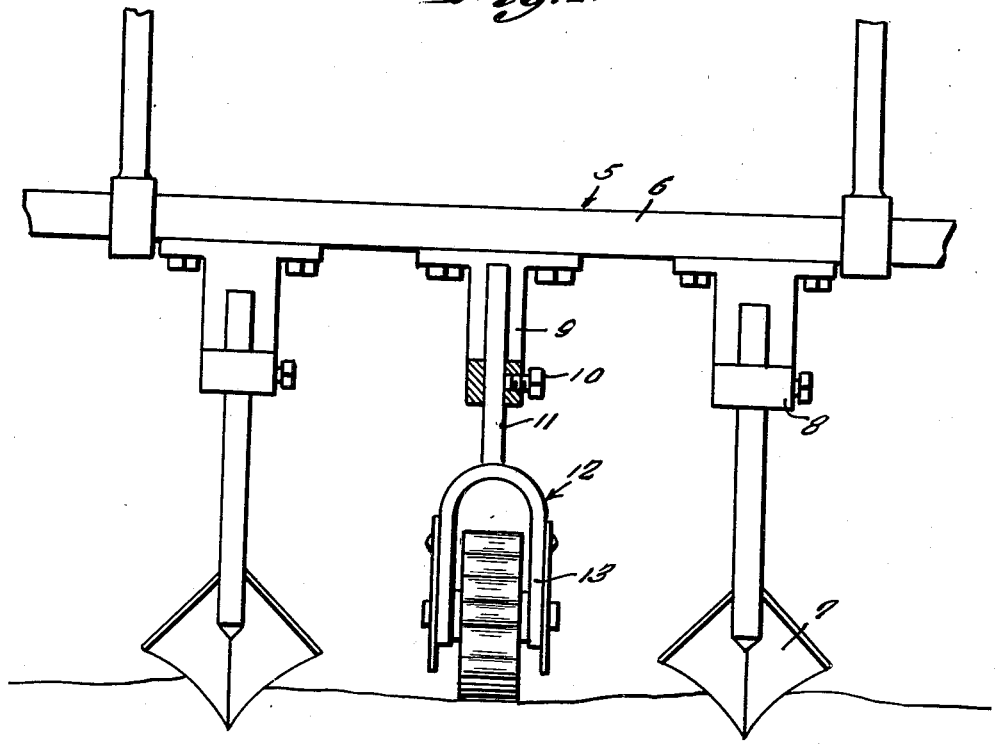
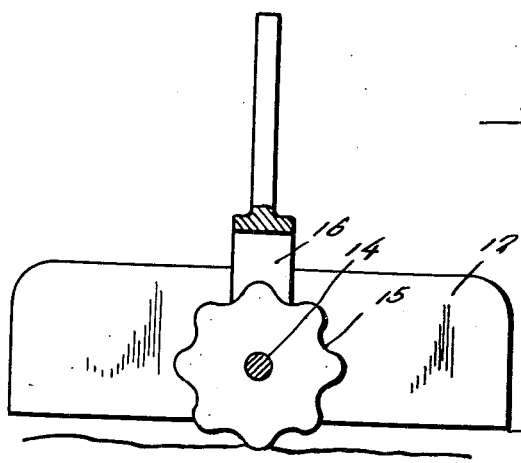

Dec. 5, 1939.                    C. ACHEN                    2,182,270
                         ATTACHMENT FOR CULTIVATORS
                            Filed Aug. 11, 1938            2 Sheets-Sheet 2
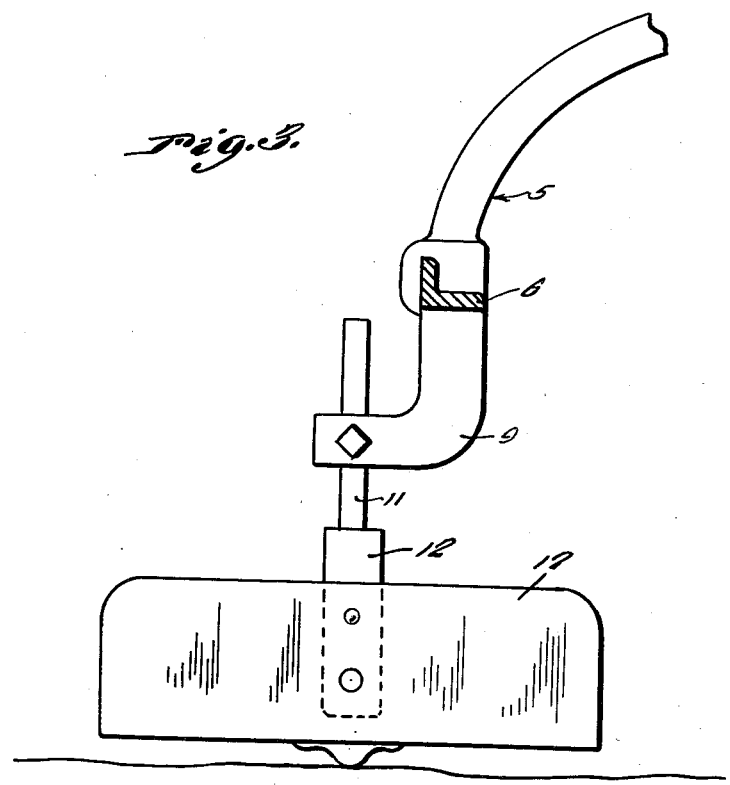
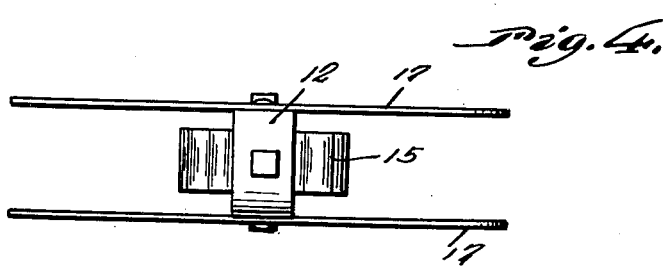
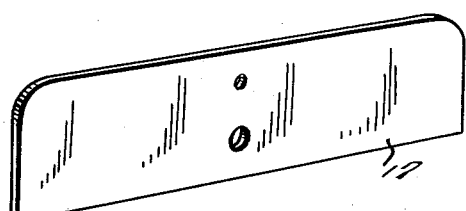

Patented Dec. 5, 1939

2,182,270

UNITED STATES PATENT OFFICE 2,182,270

ATTACHMENT FOR CULTIVATORS

Chris Achen and William Poppler, Zurich, Mont.

Application August 11, 1938, Serial No. 224,406

1 Claim. (Cl. 97—52)

This invention relates to attachments for cultivators and other similar farming implements, and has for the primary object the provision of a device which may be readily adapted to a cultivator employed for the cultivation of beets and similar vegetation and is particularly used when the soil is irrigated and becomes baked or crusted causing retarding of the germination of the seeds and the growth thereof to penetrate or break through the top soil, the attachment during the cultivating operation acting to break the soil directly above the seed so that the growth thereof will be stimulated and permit the growth to freely pass through the top soil.

With these and other objects in view, the invention consists in certain novel features of construction, combination and arrangement of parts to be hereinafter more fully described and claimed.

For a complete understanding of our invention, reference is to be had to the following description and accompanying drawings, in which Figure 1 is a fragmentary rear elevation illustrating a portion of a cultivator with an attachment applied thereto and constructed in accordance with our invention.

Figure 2 is a side elevation partly in section illustrating the attachment.

Figure 3 is a side elevation, partly in section, illustrating the attachment adapted to a portion of the cultivator.

Figure 4 is a top plan view illustrating the attachment.

Figure 5 is a perspective view illustrating one of the shield plates.

Referring in detail to the drawings, the numeral 5 indicates a fragmentary portion of a cultivator or similar farming implement employed for the cultivation of beets and like vegetation and the shovel or ground engaging element beam being indicated by the numeral 6. The ground engaging elements are shown at 7 and are supported on the beam 6 by brackets 8. The ground engaging elements 7 are spaced to operate at each side of a row of planted seed for the purpose of working the soil between the rows of seeds. The foregoing description briefly describes a conventional type of cultivator and to which the present invention is adapted.

A bracket 9 is secured on the beam 6 between the brackets 8 and has adjustably secured thereto by a set screw 10 a shank 11 in which a portion thereof is of substantially U shape, as shown at 12, to provide parallel arms 13 in which is journaled an axle 14. Mounted on the axle 14 for free rotation is a roller 15, the periphery of which is provided with corrugations 16. The corrugated periphery of the roller when in engagement with the ground is adapted to break the top soil.

Elongated shield plates 17 are secured to the arms 13 and their lower edges are spaced a limited distance above the surface of the ground. The purpose of the shield plates is to prevent soil thrown up by the ground engaging elements 7 from being deposited onto the rows of seeds and also to prevent the roller 15 from throwing soil picked up thereby laterally of the row. It is to be understood that during the cultivating operation the shovels or ground engaging elements 7 act on the soil between rows of seed while the roller rides on the soil directly above the rows of seed so as to break or crush the top soil which will stimulate the growth of the seeds and permit the growth to readily pass through the top soil.

In lands which are frequently irrigated, the top soil thereof becomes crusted which retards growth of seeds and prevents the growth from passing through the top soil. Through the use of the present invention on such soil the seeds will be stimulated in growth and the growth allowed to freely pass through the top soil.

It is believed that the foregoing description when taken in connection with the drawings will fully set forth the construction and advantages of this invention to those skilled in the art to which such invention relates so that further detailed description will not be necessary.

What we claim is:

An attachment for cultivators comprising a bracket secured on a cultivator between spaced ground engaging elements of the cultivator, a shank adjustably secured to said bracket and including a forked portion, a corrugated roller journaled between and on the forked portion for acting on the soil to crush the surface, and shield plates secured to the forked portion at opposite ends of the roller and spaced a limited distance above the surface of the ground to act as shields to prevent said roller from throwing soil picked up thereby laterally off the row, said plates being of elongated rectangular form and disposed lengthwise to extend well beyond the front and rear of said roller.

CHRIS ACHEN.
WILLIAM POPPLER.